(12) United States Patent
Su et al.

(10) Patent No.: US 11,531,942 B2
(45) Date of Patent: Dec. 20, 2022

(54) OPERATION ADJUSTMENT METHOD AND SYSTEM FOR METRO TRAINS UNDER THE CONDITION OF TRAIN OUT OF SERVICE

(71) Applicant: Beijing Jiaotong University, Beijing (CN)

(72) Inventors: Shuai Su, Beijing (CN); Boyi Su, Beijing (CN); Zhikai Wang, Beijing (CN)

(73) Assignee: BEIJING JIAOTONG UNIVERSITY, Beijing (CN)

( * ) Notice: Subject to any disclaimer, the term of this patent is extended or adjusted under 35 U.S.C. 154(b) by 0 days.

(21) Appl. No.: 17/641,373

(22) PCT Filed: Jun. 24, 2021

(86) PCT No.: PCT/CN2021/102084
§ 371 (c)(1),
(2) Date: Mar. 8, 2022

(87) PCT Pub. No.: WO2022/147973
PCT Pub. Date: Jul. 14, 2022

(65) Prior Publication Data
US 2022/0277237 A1    Sep. 1, 2022

(30) Foreign Application Priority Data

Jan. 7, 2021 (CN) .......................... 202110018469.8

(51) Int. Cl.
*G06Q 10/06* (2012.01)
(52) U.S. Cl.
CPC .............................. *G06Q 10/06312* (2013.01)
(58) Field of Classification Search
CPC ....................................................... G06Q 10/06
See application file for complete search history.

(56) References Cited

U.S. PATENT DOCUMENTS

2010/0305996 A1* 12/2010 Erhard .................... B61L 27/12
705/7.36
2012/0197466 A1* 8/2012 Yoshimoto .............. B61L 23/34
701/19

(Continued)

FOREIGN PATENT DOCUMENTS

CN      101853440 A      10/2010
CN      107284480 A      10/2017

(Continued)

OTHER PUBLICATIONS

Pritesh Mistry, Phil Lane and Paul Allen, Railway Point-Operating Machine Fault Detection Using Unlabeled Signaling Sensor Data, School of Computing and Engineering, University of Huddersfield, Queensgate, Huddersfield, Published: May 9, 2020. (Year: 2020).*

(Continued)

*Primary Examiner* — Kurtis Gills
(74) *Attorney, Agent, or Firm* — John H. Choi & Associates

(57) ABSTRACT

The disclosure provides an operation adjustment method and system for metro trains under train out of service. The method includes: acquiring basic parameters of a metro system, information of the train out of service and the online normal running trains, determining follow-up train services and current train timetables thereof, adjusting the current timetables according to predicted time to stop service of the train out of service to obtain initial adjusted train timetables, determining canceled planned train services and rolling stocks for executing remaining planned train services, and adjusting the initial adjusted train timetables according to planned train timetables of the cancelled planned train services. The disclosure can automatically adjust the train operation, and reasonably change the train timetables and the rolling stock circulation plan, thereby reducing influ- (Continued)

ences of the train out of service, and improving the degree of automation of the metro system to adapt to refined management.

7 Claims, 5 Drawing Sheets

(56) References Cited

U.S. PATENT DOCUMENTS

| | | | | |
|---|---|---|---|---|
| 2013/0168504 A1* | 7/2013 | Thiemann | ............... | B61L 25/08 |
| | | | | 246/2 R |
| 2014/0312181 A1* | 10/2014 | Duan | ...................... | E01B 35/12 |
| | | | | 246/415 R |
| 2015/0070131 A1* | 3/2015 | Beaurepaire | ......... | G01C 21/206 |
| | | | | 340/5.8 |
| 2015/0108284 A1* | 4/2015 | Pirtle | ..................... | B61L 27/00 |
| | | | | 246/4 |
| 2016/0159378 A1* | 6/2016 | Shi | ......................... | B61L 27/57 |
| | | | | 246/169 R |
| 2016/0339935 A1* | 11/2016 | Fournier | ................. | B61L 3/006 |
| 2019/0154547 A1* | 5/2019 | Wei | .................... | B61L 15/0081 |
| 2019/0263432 A1* | 8/2019 | Carlson | .................. | H04W 4/42 |
| 2019/0318253 A1* | 10/2019 | Maekawa | ............... | G06F 30/20 |
| 2020/0039548 A1* | 2/2020 | Kubo | ................. | G06Q 10/0631 |
| 2020/0357091 A1* | 11/2020 | Minakawa | ........... | G06Q 10/063 |
| 2021/0001906 A1* | 1/2021 | Wang | ............... | G06Q 10/06311 |

FOREIGN PATENT DOCUMENTS

| | | | | | |
|---|---|---|---|---|---|
| CN | 108622142 | A | | 10/2018 | |
| CN | 111523814 | A | | 8/2020 | |
| CN | 111768074 | A | | 10/2020 | |
| CN | 112793631 | A | | 5/2021 | |
| CN | 112793631 | B | | 7/2021 | |
| GB | 2485189 | A | * | 5/2012 | ............. B61L 19/06 |

OTHER PUBLICATIONS

PCT International Searching Authority/China National Intellectual Property Administration, International Search Report, PCT/CN2021/102084, dated Oct. 11, 2021.

The State Intellectual Property Office of People's Republic of China, Notification to Grant Patent Right for Invention, App. No. 202110018469.8.

* cited by examiner

OPERATION ADJUSTMENT METHOD AND SYSTEM FOR METRO TRAINS UNDER THE CONDITION OF TRAIN OUT OF SERVICE

CROSS REFERENCE TO RELATED APPLICATION

The present application claims priority to the Chinese Patent Application No. 202110018469.8, filed with the China National Intellectual Property Administration (CNIPA) on Jan. 7, 2021, and entitled "OPERATION ADJUSTMENT METHOD AND SYSTEM FOR METRO TRAINS UNDER THE CONDITION OF TRAIN OUT OF SERVICE", which is incorporated herein by reference in its entirety.

TECHNICAL FIELD

The present disclosure relates to the technical field of train operation control and dispatching commands, and in particular, to an operation adjustment method and system for metro trains under the condition of train out of service.

BACKGROUND ART

In recent years, the urban metro has been regarded as a backbone of the urban public transportation system for its large transport capacity, high punctuality rate and low energy consumption. However, due to the limited infrastructures, ever-increasing passengers and shorter headway's between trains, the metro system is facing the high load operation. In this situation, once faults or emergencies occur in the metro system, the train delay would spread quickly, resulting in reduced line service capability, a large number of stranded passengers, and potential safety hazards to the platforms.

As a complex and huge technical system, the metro requires multi-professional cooperation and orderly linkage about safe driving among multiple subsystems, such as traction power supply subsystems, signal subsystems, environment control subsystems and rolling stock subsystems. This also means that any faulty subsystem will influence operation of the trains within a certain range. Among numerous fault handling categories, scenarios where trains do not meet service requirements due to faults occur frequently. According to statistics of the China Association of Metros (CAMET), there were 8,953 fault events with train out of service in 2019. In case of one or more trains out of service, there will be a shortage of rolling tocks running on the main line the dispatchers need to adjust the train timetables and the rolling stock circulation plan as soon as possible with comprehensive consideration of available rolling stock resources and topological line structures. This imposes high requirements on response and handling capability of the dispatchers. Hence, in case of one or more trains out of service, it is one of key research directions of the metro system to formulate a reasonable train operation adjustment strategy via an intelligent train operation organization.

Currently, under the condition of train out of service, the train operation is still adjusted manually, specifically, the dispatchers acquire fault information, and give dispatching commands based on working experience, for example, detaining trains, or making use of the backup rolling stock. The whole process is implemented via dispatching telephone, which does not realize automation and intellectualization. On the other hand, with the limited line resources and insufficient rolling stock in service, many complicated factors need to be considered in train operation adjustment, including the number of backup rolling stocks, running time required for a train to leave the depot; running time required for a train to turn back, and so on. Manual processing requires the dispatcher to make a quick response, so that the result may not be reasonable; and there are individual differences in the processing results of different dispatchers, easily resulting in a large number of stranded passengers and the insufficient fulfillment rate of the operation diagram. At last, the way of information transmission through telephone communication is inefficient and cannot ensure the accuracy of the dispatching commands. Therefore, once the driver makes a mistake in receiving or executing the commands, the impact arising from the fault will be larger.

To sum up, the current operation adjustment methods under the condition of train out of service have the following defects:

1. The manual processing is still used as a main method for adjusting operation under the condition of train out of service, and automation and intellectualization of the processing are not realized;

2. Various factors need to be considered for operation adjustment under the condition of train out of service, and the dispatcher is required to rapidly make decisions, which cannot ensure a reasonable result;

3. The way of information transmission through telephone communication is inefficient and cannot ensure the accuracy of the dispatching commands.

SUMMARY

An objective of the present disclosure is to provide an operation adjustment method and system for metro trains under the condition of train out of service. The present disclosure can automatically adjust the train operation according to the information of the train out of service, and reasonably change the train timetables and the rolling stock circulation plan, thereby reducing influences of the train out of service on passengers, and improving the degree of automation of the metro system to adapt to refined management.

To implement the above objective, the present disclosure provides the following solutions:

An operation adjustment method for metro trains under the condition of train out of service includes:

acquiring, when a train has fault, basic parameters of a metro system, information of the train out of service and information of online normal running trains, where the basic parameters of the metro system include information of topological metro line information and a planned operation diagram; the planned operation diagram includes train timetables and a rolling stock circulation plan; the information of the train out of service includes a faulty train service, train fault time, predicted time to stop service and a fault position; and the information of the online normal running trains includes train service numbers, train velocities when the fault occurs and positions when the fault occurs;

determining, according to the basic parameters of the metro system, the faulty train service out of service and the planned operation diagram, a follow-up train service set of the faulty train service and a current train timetable for each of follow-up train services in the follow-up train service set, where the follow-up train services include tracking train services of the faulty train and planned train services not started;

adjusting, according to the predicted time to stop service of the train out of service, with a minimum headway as a constraint and a minimal deviation from the train timetables as a goal, the current train timetable for each follow-up train service in the follow-up train service set to obtain an adjusted train timetable for each follow-up train service in the follow-up train service set, and determining initial adjusted train timetables;

determining, according to the basic parameters of the metro system and the train fault time of the train out of service, earliest time that backup rolling stocks can run to the main line in the metro system;

canceling, according to the adjusted train timetable for each follow-up train service in the follow-up train service set, the earliest time that backup rolling stocks can run to the main line, all planned train services to be executed after the fault, and the rolling stock circulation plan of the planned operation diagram, planned train services that cannot be executed according to the planned train timetables in the planned operation diagram, to obtain a set of planned train services to be canceled, and determining rolling stocks for executing remaining planned train services in the planned operation diagram, to obtain an adjusted rolling stock circulation plan;

adjusting the initial adjusted train timetables according to the planned train timetable for each planned train service in the set of planned train services to be canceled, to obtain final adjusted train timetables; and generating an adjusted operation diagram according to the adjusted rolling stock circulation plan and the final adjusted train timetables.

Optionally, after determining, according to the basic parameters of the metro system, the faulty train service out of service and the information of the online normal running trains, a follow-up train service set for the faulty train service and a current train timetable for each follow-up train service in the follow-up train service set, the method may further include:

determining, according to the fault position of the train out of service by using an equation $$j' = \arg\min_j |S_{fault} - S_j^{line} \cdot \eta_j|,$$

a parking position nearest to the train out of service; and storing the train out of service to the nearest parking position, where, j' is the parking position nearest to the train out of service, $S_{fault}$ is the fault position of the train out of service, $S_j^{line}$ is a position of a jth storage track, and $\eta_j$ is an occupation sign of the jth storage track.

Optionally, adjusting, according to the predicted time to stop service of the train out of service, with the minimum headway as a constraint and the minimal deviation from the planned train timetable as the goal, the current train timetable for each follow-up train service in the follow-up train service set to obtain an adjusted train timetable for each follow-up train service in the follow-up train service set, may specifically include:

determining, based on the speed curves of running levels in the onboard ATO system by using an equation $$r_{k,n} = \sum_{l \in L} \delta_{k,n}^l r_{k,n}^l,$$

running time of each follow-up train service in the follow-up train service set between two adjacent subsequent stations behind a position when the fault occurs;

determining, by using an equation $$d_{k,n} = \frac{\min\{P_{k,n}^{wait}, C_{k,n}^{remain}\}}{\lambda},$$

dwelling time of each follow-up train service in the follow-up train service set at each follow-up station behind the position when the fault occurs; and adjusting, according to the predicted time to stop service of the train out of service, running time of each follow-up train service between subsequent stations, the dwelling time of each follow-up train service at each follow-up station and a train velocity of each follow-up train service when the fault occurs, with the minimum headway as a constraint and the minimal deviation from the planned train timetable as the goal, the current train timetable for each follow-up train service in the follow-up train service set to obtain the adjusted train timetable for each follow-up train service in the follow-up train service set, where, $r_{k,n}$ is running time of a follow-up train service k between a follow-up station n−1 and a follow-up station n; $\delta_{k,n}^l$ indicates whether the follow-up train service k selects an identifier having a level l in an interval between the follow-up station n−1 and the follow-up station n, if the follow-up train service k runs in the interval at the level l, then $\delta_{k,n}^l=1$, or otherwise, $\delta_{k,n}^l=0$; $r_{k,n}^l$ is required time for the follow-up train service k to run at the level l in the interval between the follow-up station n−1 and the follow-up station n; $d_{k,n}$ is dwelling time of the follow-up train service k at the follow-up station n; $P_{k,n}^{wait}$ is a number of passengers waiting on the platform when the follow-up train service k arrives at the follow-up station n; $C_{k,n}^{remain}$ is a remaining passenger capacity when the follow-up train service k arrives at the follow-up station n; and $\lambda$ is a passenger boarding rate.

Optionally, determining, according to the basic parameters of the metro system and the train fault time of the train out of service, earliest time that backup rolling stocks can run to the main line in the metro system, may specifically include:

acquiring a backup rolling stock set on all storage tracks from the topological metro line information of the basic parameters of the metro system; and determining, according to the train fault time of the train out of service by using an equation $T_m^{earliest}=T_{fault}+t_{j_m}^{online}$, earliest time that each backup rolling stock in the backup rolling stock set runs to a main line as the earliest time that backup rolling stocks can run to the main line, where, $T_m^{earliest}$ is earliest time that a backup rolling stock m runs to the main line, $T_{fault}$ is the train fault time of the train out of service, $j_m$ is a storage track where the backup online rolling stock m is located, and $t_{j_m}^{online}$ is time that the backup rolling stock m runs from the storage track $j_m$ to the main line.

Optionally, canceling, according to the adjusted train timetable for each follow-up train service in the follow-up train service set, the earliest time that backup rolling stocks can run to the main line, all planned train services to be executed after the train fault time of the train out of service, and the rolling stock circulation plan of the planned operation diagram, planned train services that cannot be executed according to the planned train timetables in the planned operation diagram, to obtain the set of planned train services to be canceled, and determining rolling stocks for executing remaining planned train services in the planned operation diagram, to obtain the adjusted rolling stock circulation plan, may specifically include:

comparing the adjusted train timetable for each follow-up train service in the follow-up train service set with the planned operation diagram to obtain planned train services required to depart lately at corresponding origin stations in the planned operation diagram and late departure time of the late departing planned train services;

canceling corresponding late departing planned train services with late departure time greater than preset maximum late departure time to obtain a first set of planned train services to be canceled;

forming a to-be-canceled planned train service set with a planned turn-back train service of each follow-up train service in the follow-up train service set and all planned train services to be executed after the fault;

acquiring an idle rolling stock set on the storage tracks, and determining, on a premise of meeting a minimum turn-back time, whether the idle rolling stock set on the storage tracks includes a backup rolling stock that can be executed according to a planned train timetable of an eth to-be-canceled planned train service in the to-be-canceled planned train service set to obtain a first determination result;

adjusting, if the first determination result indicates yes, the rolling stock circulation plan of the planned operation diagram, such that the backup rolling stock that can be executed according to the planned train timetable of the eth to-be-canceled planned train service in the to-be-canceled planned train service set executes the eth to-be-canceled planned train service to obtain the adjusted rolling stock circulation plan;

determining, if the first determination result indicates no, according to the earliest time that backup rolling stocks can run to the main line, whether the backup rolling stock set includes a backup rolling stock that can be executed according to the planned train timetable of the eth to-be-canceled planned train service in the to-be-canceled planned train service set to obtain a second determination result;

adjusting, if the second determination result indicates yes, the rolling stock circulation plan of the planned operation diagram, such that the backup rolling stock that can be executed according to the planned train timetable of the eth to-be-canceled planned train service in the to-be-canceled planned train service set executes the eth to-be-canceled planned train service to obtain the adjusted rolling stock circulation plan;

canceling the eth to-be-canceled planned train service if the first determination result indicates no;

updating a numerical value of the to-be-canceled planned train service e, and going back to the step of "acquiring an idle rolling stock set on the storage tracks, and determining, on a premise of meeting a minimum turn-back time, whether the idle rolling stock set on the storage tracks includes a backup rolling stock that can be executed according to a planned train timetable of an eth to-be-canceled planned train service in the to-be-canceled planned train service set to obtain a first determination result", until all to-be-canceled planned train services in the to-be-canceled planned train service set are traversed, to obtain a second set of planned train services to be canceled; and forming a set of planned train services to be canceled with the first set of planned train services to be canceled and the second set of planned train services to be canceled.

Optionally, after canceling, according to the adjusted train timetable for each follow-up train service in the follow-up train service set, the earliest time that backup rolling stocks can run to the main line, all planned train services to be executed after the fault, and the rolling stock circulation plan of the planned operation diagram, planned train services that cannot be executed according to the planned train timetables in the planned operation diagram, to obtain the set of planned train services to be canceled, and determining the rolling stocks for executing the remaining planned train services in the planned operation diagram, to obtain the adjusted rolling stock circulation plan, the method may further include:

acquiring a front train service and a back train service of an fth canceled planned train service in the set of planned train services to be canceled in the initial adjusted train timetable;

determining a first planned running headway between the fth canceled planned train service and the front train service, and a second planned running headway between the fth canceled planned train service and the back train service;

delaying planned arrival and departure time of the front train service according to the first planned running headway by using an equation $$\begin{cases} a_{k_{front},n} = a_{k_{front},n}^{plan} + \dfrac{h_{plan}^{front}}{2}, n = 1, 2, \ldots, N \\ d_{k_{front},n} = d_{k_{front},n}^{plan} + \dfrac{h_{plan}^{front}}{2}, n = 1, 2, \ldots, N \end{cases} ;$$

and advancing planned arrival and departure time of the back train service according to the second planned running headway by using an equation $$\begin{cases} a_{k_{back},n} = a_{k_{back},n}^{plan} - \dfrac{h_{plan}^{back}}{2}, n = 1, 2, \ldots, N \\ d_{k_{back},n} = d_{k_{back},n}^{plan} - \dfrac{h_{plan}^{back}}{2}, n = 1, 2, \ldots, N \end{cases} ,$$

where, $a_{k_{front},n}$ and $a_{k_{back},n}$ are adjusted arrival time of a front train service $k_{front}$ and a back train service $k_{back}$ at a station n respectively, $a_{k_{front},n}^{plan}$ and $a_{k_{back},n}^{plan}$ are planned arrival time of the front train service $k_{front}$ and the back train service $k_{back}$ at the station n respectively, $d_{k_{front},n}$ and $d_{k_{back},n}$ are adjusted departure time of the front train service $k_{front}$ and the back train service $k_{back}$ at the station n respectively, $d_{k_{front},n}^{plan}$ and $d_{k_{back},n}^{plan}$ are planned arrival time of the front train service $k_{front}$ and the back train service $k_{back}$ at the station n respectively, $h_{plan}^{front}$ is a first planned running headway between the front train service $k_{front}$ and the canceled train service f, $$h_{plan}^{front} = \begin{cases} d_{f,1}^{plan} - d_{k_{front},1}^{plan}, & \text{if } D_f = 2 \\ d_{f,N}^{plan} - d_{k_{front},N}^{plan}, & \text{if } D_f = 1, D_f = 2 \end{cases}$$

indicates that the canceled train service f is in an up direction, $d_{f,1}^{plan}$ is departure time of the canceled train service f at a station 1, and $d_{k_{front},1}^{plan}$ is departure time of the front train service $k_{front}$ at the station 1; $D_f=1$ indicates that the canceled train service f is in a down direction, $d_{f,N}^{plan}$ is departure time of the canceled train service f at a station N, and $d_{k_{front},N}^{plan}$ is departure time of the front train service $k_{front}$ at the station N; a running direction from the station 1 to the station N is defined as the up direction, and a running direction from the station N to the station 1 is defined as the down direction; and $h_{plan}^{back}$ is a second planned running headway between the canceled train service f and the back train service $k_{back}$, $$h_{plan}^{back} = \begin{cases} d_{k_{back},1}^{plan} - d_{f,1}^{plan}, & \text{if } D_f = 2 \\ d_{k_{back},N}^{plan} - d_{f,N}^{plan}, & \text{if } D_f = 1 \end{cases}, d_{k_{back},1}^{plan}$$

is departure time of the back train service $k_{back}$ at the station 1, and $d_{k_{back},N}^{plan}$ is departure time of the back train service $k_{back}$ at the station N.

Optionally, after generating the adjusted operation diagram according to the adjusted rolling stock circulation plan and the final adjusted train timetables, the method may further include:

acquiring, in a peak period after the fault occurs in the train, if a rolling stock resource is limited and the train out of service cannot be repaired, a number $M_{normal}$ of rolling stocks required in a normal period and a number $M_{peak}-1$ of available rolling stocks in the peak period from information of the adjusted operation diagram; and redetermining, according to the number $M_{normal}$ of the rolling stocks required in the normal period and the number $M_{peak}-1$ of the available rolling stocks in the peak period by turning back an online running train and making use of a backup rolling stock, a rolling stock circulation plan for executing planned train services in the peak period.

Optionally, redetermining, according to the number $M_{normal}$ of the rolling stocks required in the normal period and the number $M_{peak}-1$ of the available rolling stocks in the peak period by turning back an online running train and making use of a backup rolling stock, the rolling stock circulation plan for executing the planned train services in the peak period, may specifically include:

acquiring an integer part $M_{int}$ of a quotient according to the number $M_{normal}$ of the rolling stocks required in the normal period and the number $M_{peak}-1$ of the available rolling stocks in the peak period by using an equation $$M_{int} = \left\lfloor \frac{M_{peak} - 1}{M_{normal} + 1} \right\rfloor;$$

acquiring a decimal part $M_{dec}$ of the quo n according to the number $M_{normal}$ of the rolling stocks required in the noir a period and the number $M_{peak}-1$ of the available rolling stocks in the peak period by using an equation $$M_{dec} = \frac{M_{peak} - 1 - M_{int}(M_{normal} + 1)}{M_{normal} + 1};$$

initializing a train service index k'=1, an integer count i=0 and a double precision count sum=0;

setting a double precision count sum+=$M_{dec}$, and determining whether the double precision count sum is greater than 1 to obtain a third determination result;

determining, if the third determination result indicates yes, that a train service with a current train service index k', k'+1, . . . , k'+$M_{int}$ is executed by turning back the online running train, and a train service with a current train service index k'+$M_{int}$+1 is executed by making use of the backup rolling stock, and setting k'+=$M_{int}$+2, sum−=1;

determining, if the third determination result indicates no, that a train service with a current train service index k', k'+1, . . . k'+$M_{int}$−1 is executed by turning back the online running train, and a train service with a current train service index k'+$M_{int}$ is executed by making use of the backup rolling stock, and setting k'+=$M_{int}$+2;

determining whether the integer count i is less than or equal to the integer part $M_{int}$ of the quotient to obtain a fourth determination result;

setting, if the fourth determination result indicates yes, the integer count i to be added by 1, and going back to the step of "setting a double precision count sum+=$M_{dec}$, and determining whether the double precision count sum is greater than 1 to obtain a third determination result"; and outputting, if the fourth determination result indicates no, the rolling stock circulation plan for executing the planned train services in the peak period.

An operation adjustment system for metro trains under the condition of train out of service includes:

an information acquiring module, configured to acquire, when a train has fault, basic parameters of a metro system, information of a train out of service and information of online normal running trains, where the basic parameters of the metro system include topological metro line information and a planned operation diagram; the planned operation diagram includes train timetables and a rolling stock circulation plan; the information of the train out of service includes a faulty train service, train fault time, predicted time to stop service and a fault position; and the information of the online normal running trains includes train service numbers, train velocities when the fault occurs and positions when the fault occurs;

a follow-up train service and current train timetable determining module, configured to determine, according to the basic parameters of the metro system, the faulty train service out of service and the planned operation diagram, a follow-up train service set for the faulty train service and a current train timetable for each of follow-up train services in the follow-up train service set, where the follow-up train services include tracking train services of the faulty train and planned train services not started;

a module for acquiring an adjusted train timetable of each follow-up train service, configured to adjust, according to the predicted time to stop service of the train out of service, with a minimum headway as a constraint and a minimal deviation from the train timetables as a goal, the current train timetable for each follow-up train service in the follow-up train service set to obtain an adjusted train timetable for each follow-up train service in the follow-up train service set, and determining initial adjusted train timetables;

a module for determining earliest time that backup rolling stocks can run to the main line, configured to determine, according to the basic parameters of the metro system and the train fault time of the train out of service, earliest time that backup rolling stocks can run to the main line in the metro system;

an adjusted rolling stock circulation plan acquiring module, configured to cancel, according to the adjusted train timetable for each follow-up train service in the follow-up train service set, the earliest time that backup rolling stocks can run to the main line, all planned train services to be executed after the fault, and the rolling stock circulation plan of the planned operation diagram, planned train services that cannot be executed according to the planned train timetables in the planned operation diagram, to obtain a set of planned train services to be canceled, and determine rolling stocks for executing remaining planned train services in the planned operation diagram, to obtain an adjusted rolling stock circulation plan;

a module for acquiring information of an adjusted planned operation diagram, configured to adjust the initial adjusted train timetables according to the planned train timetable for each planned train service in the set of planned train services to be canceled, to obtain final adjusted train timetables; and an adjusted operation diagram generating module, configured to generate an adjusted operation diagram according to the adjusted rolling stock circulation plan and the final adjusted train timetables.

Optionally, the system may further include:

a module for acquiring a number of available rolling stocks in a peak period, configured to acquire, in a peak period after the fault occurs in the train, if a rolling stock resource is limited and the train out of service cannot be repaired, a number $M_{normal}$ of rolling stocks required in a normal period and a number $M_{peak}-1$ available rolling stocks in the peak period from the information of the adjusted operation diagram; and a module for determining a rolling stock circulation plan in the peak period, configured to redetermine, according to the number $M_{normal}$ of the rolling stocks required in the normal period and the number $M_{peak}-1$ of the available rolling stocks in the peak period by turning back an online running train and making use of a backup rolling stock online, a rolling stock circulation plan for executing planned train services in the peak period.

Based on specific embodiments provided in the present disclosure, the present disclosure discloses the following technical effects:

The operation adjustment method and system for metro trains under the condition of train out of service provided by the present disclosure are implemented by acquiring basic parameters of a metro system, information of the train out of service and information of online normal running trains when the train has fault, determining a follow-up train service set of a faulty train service and a current train timetable for each follow-up train service in the follow-up train service set, adjusting, according to predicted time to stop service of the train out of service, the current train timetable for each follow-up train service in the follow-up train service set, obtaining initial adjusted train timetables according to a train timetable of the train out of service and an adjusted train timetable for each follow-up train service, obtaining a set of planned train services to be canceled, determining rolling stocks for executing remaining planned train services in the initial adjusted train timetables, obtaining an adjusted rolling stock circulation plan, and adjusting the initial adjusted train timetables according to a planned train timetable for each planned train service in the set of planned train services to be canceled to generate an adjusted operation diagram. The present disclosure can automatically adjust the train operation according to the information about the train out of service, and reasonably change the train timetables and the rolling stock circulation plan, thereby reducing influences of the train out of service on passengers, and improving the degree of automation of the metro system to adapt to refined management.

BRIEF DESCRIPTION OF THE DRAWINGS

To describe the technical solutions in the embodiments of the present disclosure or in the conventional art more clearly, the accompanying drawings required for the embodiments are briefly described below. Apparently, the accompanying drawings in the following descriptions show merely some embodiments of the present disclosure, and a person of ordinary skill in the art may still derive other accompanying drawings from these accompanying drawings without creative efforts.

DETAILED DESCRIPTION OF THE EMBODIMENTS

The technical solutions of the embodiments of the present disclosure are clearly and completely described below with reference to the accompanying drawings. Apparently, the described embodiments are merely a part rather than all of the embodiments of the present disclosure. All other embodiments obtained by a person of ordinary skill in the art on the basis of the embodiments of the present disclosure without creative efforts shall fall within the protection scope of the present disclosure.

An objective of the present disclosure is to provide an operation adjustment method and system for metro trains under the condition of train out of service. The present disclosure can automatically adjust the train operation according to the information about the train out of service, and reasonably change the train timetable and the rolling stock circulation plan, thereby reducing influences of the train out of service on passengers, and improving the degree of automation of the metro system to adapt to refined management.

To make the above objectives, features, and advantages of the present disclosure clearer and more comprehensible, the present disclosure will be further described in detail below with reference to the accompanying drawings and the specific examples.

Figure 1:
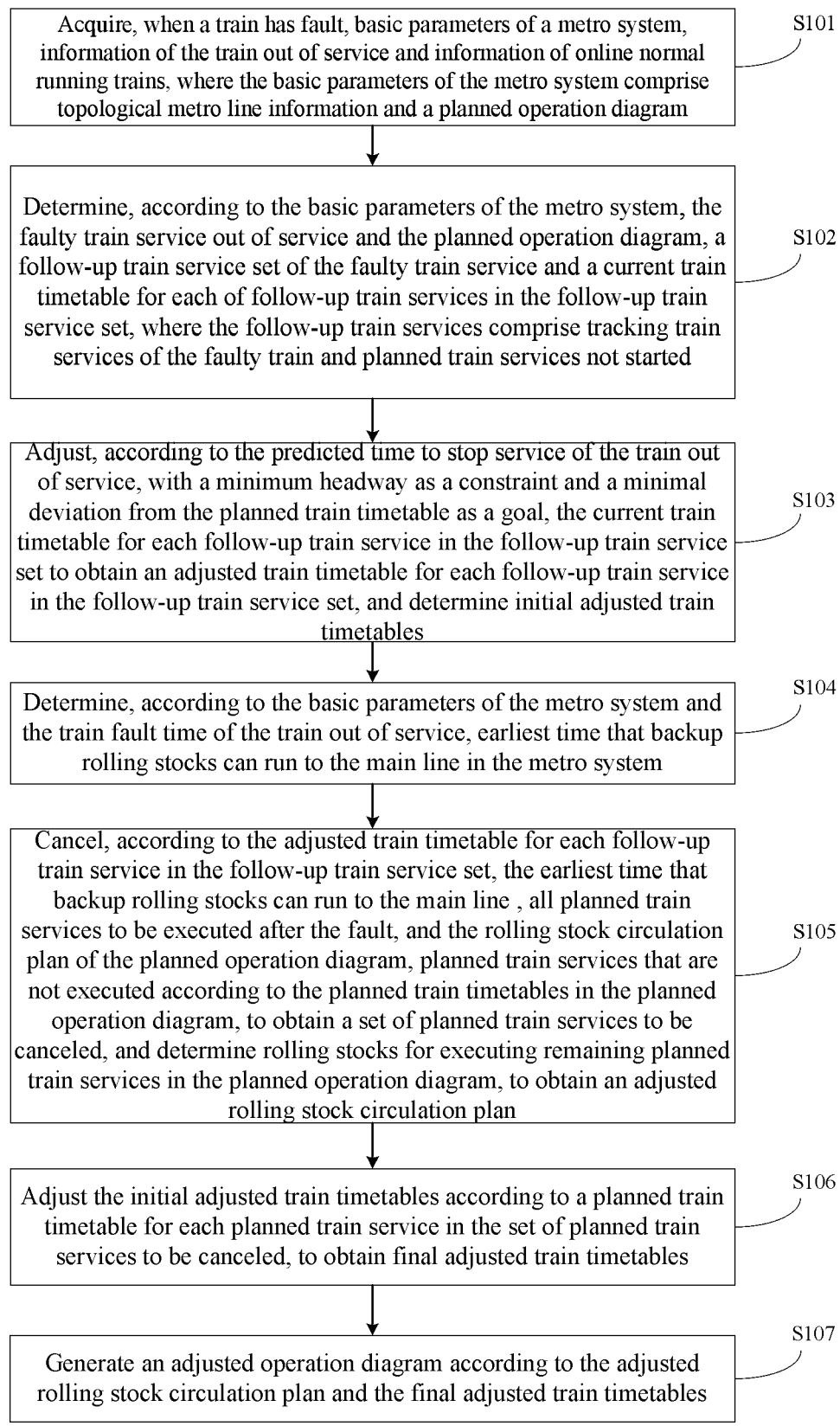
FIG. 1 is a flow chart of an operation adjustment method for metro trains under the condition of train out of service according to the present disclosure.
Figure 2:
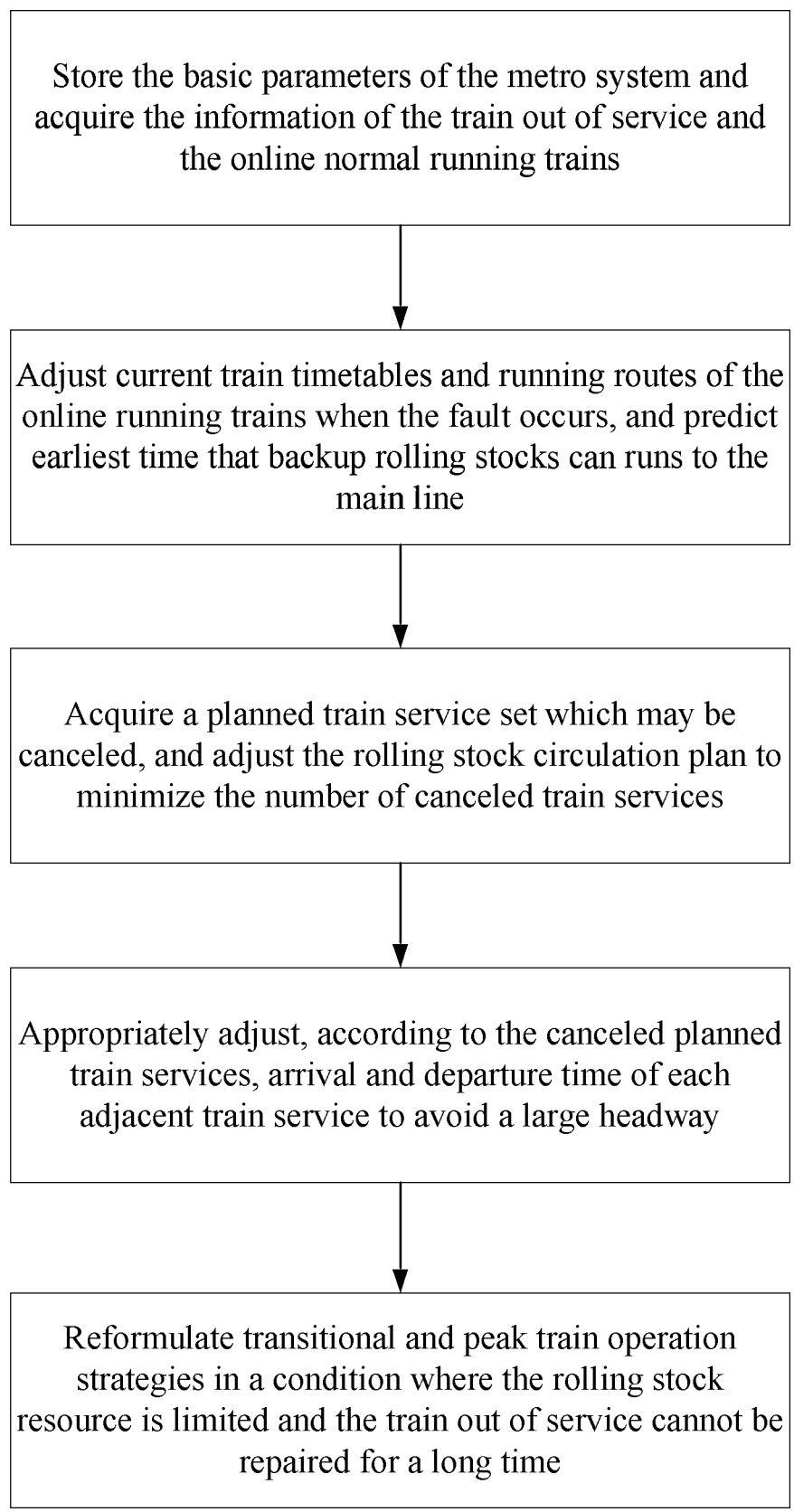
FIG. 2 is a brief flow chart of an operation adjustment method for metro trains under the condition of train out of service according to the present disclosure.

As shown in FIGS. 1-2, an operation adjustment method for metro trains under the condition of train out of service includes:

S101: acquiring, when a train has fault, basic parameters of a metro system, information of the train out of service and information of online normal running trains, where the basic parameters of the metro system include topological metro line information and a planned operation diagram; the planned operation diagram includes train timetables and a rolling stock circulation plan; the information of the train out of service includes a faulty train service, train fault time, predicted time to stop service and a fault position; and the information of the online normal running trains includes train service numbers, train velocities when the fault occurs and positions when the fault occurs;

S102: determining, according to the basic parameters of the metro system, the faulty train service out of service and the planned operation diagram, a follow-up train service set for the faulty train service and a current train timetable for each of follow-up train services in the follow-up train service set, where the follow-up train services include tracking train services of the faulty train and planned train services not started;

S103: adjusting, according to the predicted time to stop service of the train out of service, with a minimum headway as a constraint and a minimal deviation from the train timetables as a goal, the current train timetable for each follow-up train service in the follow-up train service set to obtain an adjusted train timetable for each follow-up train service in the follow-up train service set, thereby determining initial adjusted train timetables;

S104: determining, according to the basic parameters of the metro system and the train fault time of the train out of service, earliest time that backup rolling stocks can run to the main line in the metro system;

S105: cancelling, according to the adjusted train timetable for each follow-up train service in the follow-up train service set, the earliest time that backup rolling stocks can run to the main line, all planned train services to be executed after the fault, and the rolling stock circulation plan of the planned operation diagram, planned train services that cannot be executed according to the planned train timetables in the planned operation diagram, to obtain a set of planned train services to be canceled, and determining rolling stocks for executing remaining planned train services in the planned operation diagram, to obtain an adjusted rolling stock circulation plan;

S106: adjusting the initial adjusted train timetables according to the planned train timetable for each planned train service in the set of planned train services to be canceled, to obtain final adjusted train timetables; and S107: generating an adjusted operation diagram according to the adjusted rolling stock circulation plan and the final adjusted train timetables.

The specific process is as follows:

In step S101, the stored basic parameters of the metro system include a line topology and operation data. The line topology includes station positions and siding types, and the number and positions of storage tracks at each depot and station; and the operation data includes a planned operation diagram, a minimum headway, a position of each backup rolling stock and the number of backup rolling stock, running time required for the backup rolling stock to leave the depot and shortest turn-back time. The information of the train out of service includes a train service number of the faulty train, the fault time, the fault position, and the time to stop service when the fault occurs in the train; and the information of the online running trains includes train service numbers, velocities and positions of all normal running trains. All parameters are represented by the following letters:

A.1: configuring, according to an actual line condition of the metro system, the topological line information: the number N of stations and positions $S_1^{sta}, \ldots, S_n^{sta}, \ldots, S_N^{sta}$ thereof, the number J of storage tracks at a depot and a station, positions $S_1^{line}, \ldots, S_j^{line}, \ldots, S_J^{line}$ of the storage tracks and occupation sign $\eta_j$ (indicating whether there is a train on the storage track) thereof, a running direction from the station 1 to the station N being defined as an up direction, a running direction from the station N to the station 1 being defined as a down direction, and a siding type $\xi_n^{sta}$ of the station n, namely $$\xi_n^{sta} = \begin{cases} 0, \text{ if the station } n \text{ does not provide the turn-back line} \\ 1, \text{ if the station } n \text{ provides the turn-back line} \end{cases};$$

A.2: configuring, according to an operation condition, planned operation parameters: information of the planned operation diagram, including a planned train set K, departure time $d_{k,n}^{plan}$, arrival time $a_{k,n}^{plan}$ and a running direction $D_k$ of a train service k at the station n, $$D_k = \begin{cases} 1, \text{ if the train service } k \text{ is in the down direction} \\ 2, \text{ if the train service } k \text{ is in the up direction} \end{cases},$$

a minimum running headway $h_{min}$, time $r_{k,n}^l$ required for a train to run at a level l in an interval between a station n−1 and the station n, shortest turn-back time $t_{turn}$, and time $t_j^{online}$ that a backup train runs to a main line from a storage track j; and A.3: acquiring the information of the train out of service and online normal running trains: a train service k* of the train out of service, the fault time $T_{fault}$, the fault position $S_{fault}$, the predicted time to stop service $T_{drop}$, velocities and positions of all online normal running trains when the fault occurs in the train.

In step S102, when the fault occurs in the train, namely at the time point $T_{fault}$, an affected train set is acquired, according to the information of online running trains and the information of the planned operation diagram in step A, the affected train set including the train service k* of the train out of service and a follow-up train service set $K_{follow}$ thereof.

After S102, the method further includes:

determining, according to the fault position of the train out of service by using an equation $$j' = \arg\min_j |S_{fault} - S_j^{line} \cdot \eta_j|,$$

a parking position nearest to the train out of service;

storing the train out of service to the nearest parking position, where, j' is the parking position nearest to the train out of service, $S_{fault}$ is the fault position of the train out of service, $S_j^{line}$ is a position of a jth storage track; and $\eta_j$ is an occupation sign of the jth storage track; and taking a route where the train out of service runs from a current position to the parking position as a new running route, and adjusting a current train timetable of the train out of service, where the train out of service does not stop at subsequent stations, and is subjected to a skip-stop operation, namely arrival time being the same as departure time, at stations in the route.

In step S103, adjusting current train timetables of the normal running trains, indicates, in a condition where the minimum running headway is ensured, adjusting arrival and departure time at the subsequent stations to prevent expansion of the influence of the faulty train out of service, specifically includes:

determining, based on the speed curves of running levels in the onboard ATO by using an equation $$r_{k,n} = \sum_{l \in L} \delta_{k,n}^l r_{k,n}^l,$$

running time of each follow-up train service in the follow-up train service set between two adjacent subsequent stations behind a position when the fault occurs;

determining, by using an equation $$d_{k,n} = \frac{\min\{P_{k,n}^{wait}, C_{k,n}^{remain}\}}{\lambda},$$

dwelling time of each follow-up train service in the follow-up train service set at each follow-up station behind the position when the fault occurs; and adjusting, according to the predicted time to stop service of the train out of service, running time of each follow-up train service between subsequent stations, dwelling time of each follow-up train service at each follow-up station and a train velocity of each follow-up train service when the fault occurs, with the minimum headway as a constraint and the minimal deviation from the planned train timetable as the goal, the current train timetable for each follow-up train service in the follow-up train service set to obtain the adjusted train timetable for each follow-up train service in the follow-up train service set, where, $r_{k,n}$ is running time of a follow-up train service k between a follow-up station n−1 and a follow-up station n; $\delta_{k,n}^{l}$ indicates whether the follow-up train service k selects an identifier with a level l in an interval between the follow-up station n−1 and the follow-up station n, and if the follow-up train service k runs at the level l in the interval, then $\delta_{k,n}^{l}=1$, or otherwise, $\delta_{k,n}^{l}=0$; $r_{k,n}^{l}$ is time required by the follow-up train service k to run at the level l in the interval between the follow-up station n−1 and the follow-up station n; $d_{k,n}$ is dwelling time of the follow-up train service k at the follow-up station n; $P_{k,n}^{wait}$ is the number of passengers waiting on the platform when the follow-up train service k arrives at the follow-up station n; $C_{k,n}^{remain}$ is a remaining passenger capacity when the follow-up train service k arrives at the follow-up station n; and $\lambda$ is a passenger boarding rate.

Figure 3:
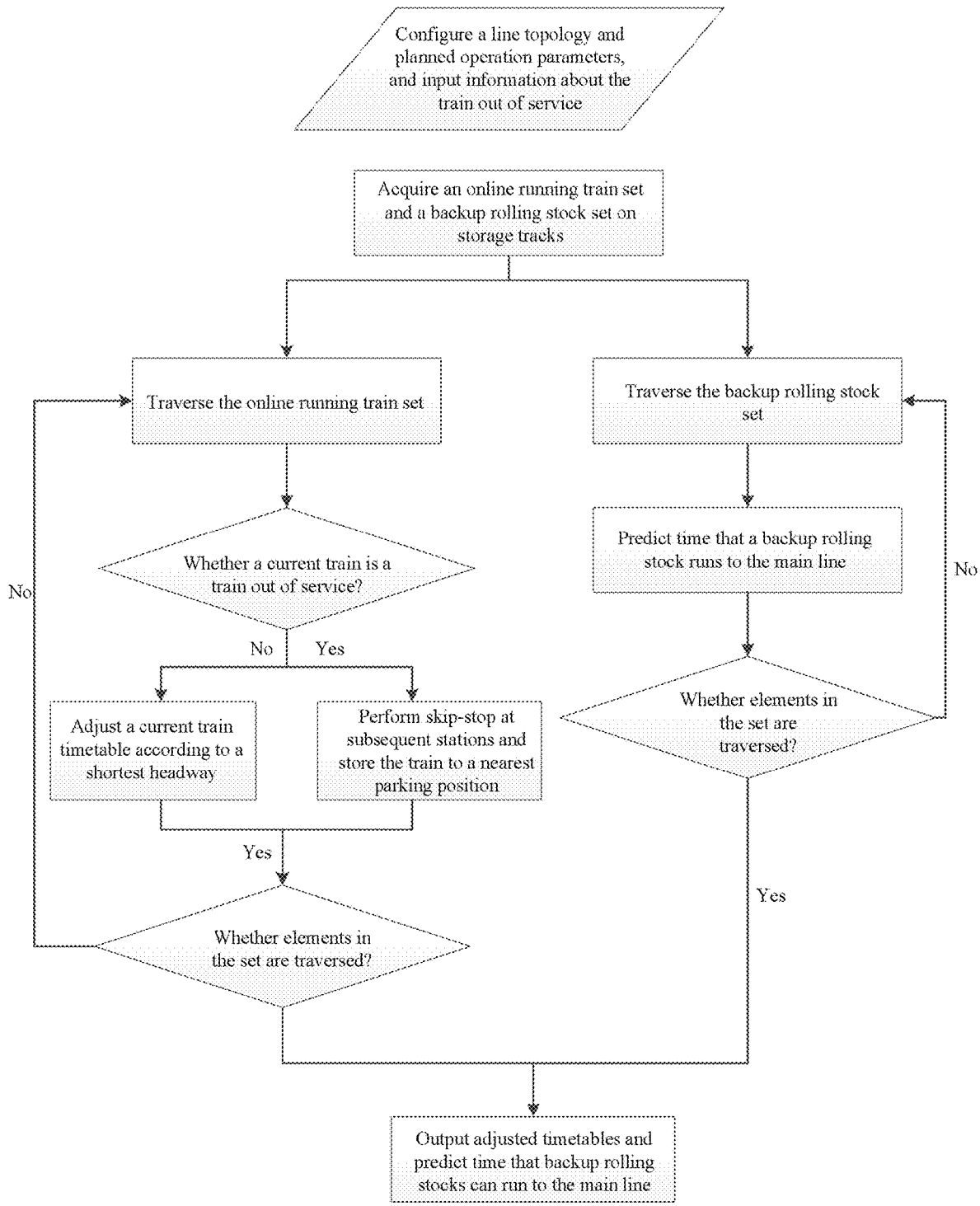
FIG. 3 is a schematic view for acquiring an initial adjusted train timetable and determining earliest time that backup rolling stocks can run to the main line in a metro system according to the present disclosure.

The principle of step S104 is as shown in FIG. 3.

Step S104 specifically includes:

acquiring a backup rolling stock set on all storage tracks from the topological metro line information; and determining, according to the train fault time of the train out of service by using an equation $T_m^{earliest} = T_{fault} + t_{j_m}^{online}$, earliest time that each backup rolling stock in the backup rolling stock set runs to a main line as the earliest time that backup rolling stocks can run to the main line, where, $T_m^{earliest}$ is earliest time that a backup rolling stock m runs to the main line, $T_{fault}$ is the train fault time of the train out of service, $j_m$ is a storage track where the backup rolling stock m is located, and $t_{j_m}^{online}$ is time that the backup rolling stock m runs from the storage track $j_m$ to the main line.

Figure 4:
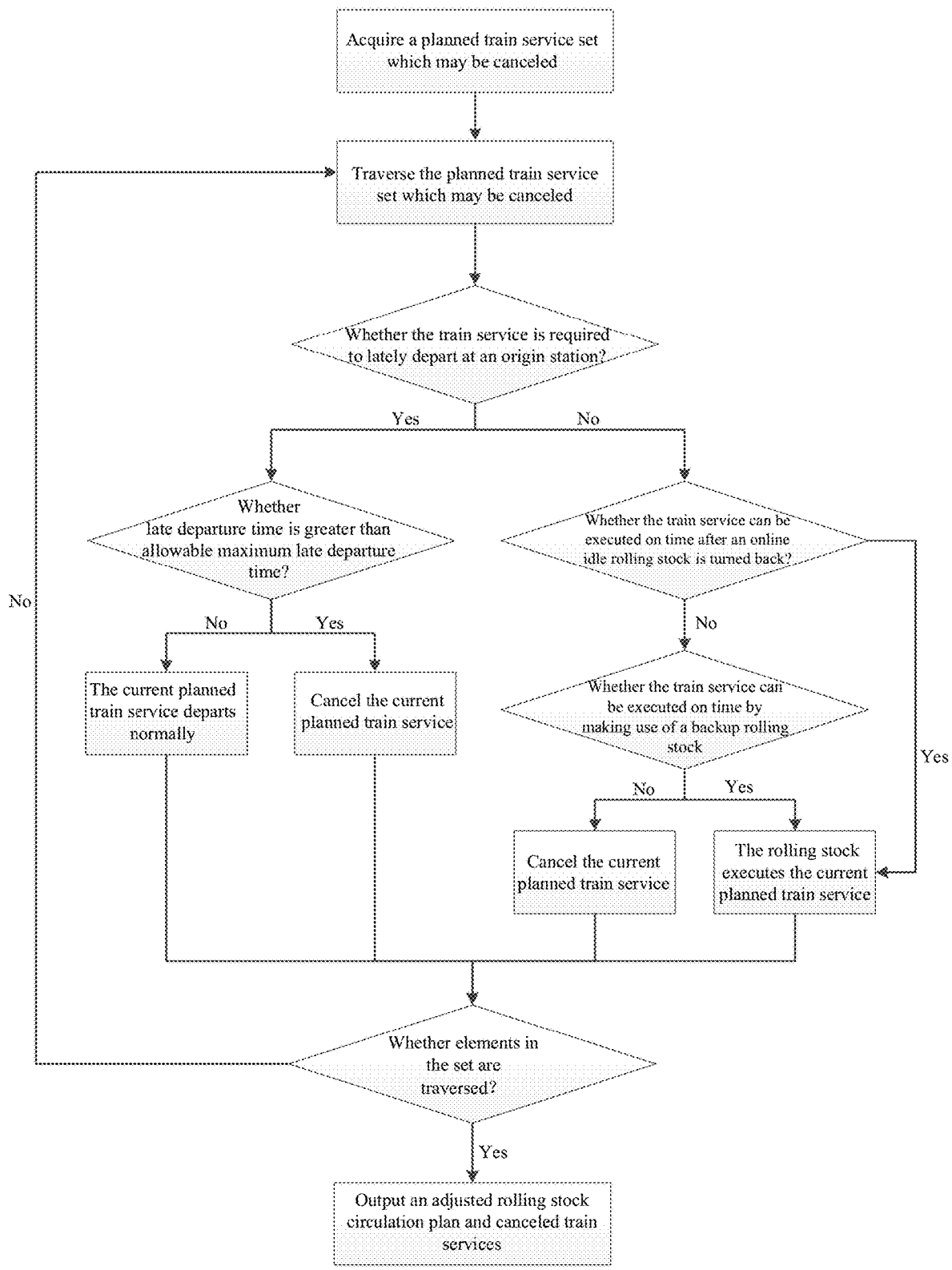
FIG. 4 is a schematic view for acquiring an adjusted rolling stock circulation plan according to the present disclosure.

In step S105, planned train services which may be cancelled are acquired according to the adjusted timetables of the online running trains and earliest time that backup rolling stocks can run to the main line, and the rolling stock circulation plan is adjusted to minimize the number of train services which may be cancelled, where the planned train services which may be cancelled mainly include planned turn-back train services of adjusted train services, train services required to depart lately at origin stations and train services to be subsequently executed by the train out of service. As shown in FIG. 4, step 105 specifically includes:

comparing the adjusted train timetable for each follow-up train service in the follow-up train service set with the planned operation diagram to obtain planned train services required to depart lately at the origin station in the planned operation diagram and late departure time of the late departing planned train services;

canceling corresponding late departing planned train services with late departure time greater than preset maximum late departure time to obtain a first set of planned train services to be canceled, where with the station 1 as the origin station of the up train service, the station N as the origin station of the down train service, and γ representing a determination result, whether the late departure time is greater than the preset maximum late departure time is calculated by the following equation:

$$\gamma = \begin{cases} 1, & \text{if } \left(d_{k,1} - d_{k,1}^{plan} \leq d_{max}^{late} \text{ and } D_k = 2\right) \text{ or} \\ & \left(d_{k,N} - d_{k,N}^{plan} \leq d_{max}^{late} \text{ and } D_k = 1\right) \\ 0, & \text{otherwise} \end{cases},$$

where, $d_{max}^{late}$ represents the preset maximum late departure time, if γ=1, the train service can depart, or otherwise, the train service is canceled;

forming a to-be-canceled planned train service set with a planned turn-back train service of each follow-up train service in the follow-up train service set $K_{follow}$ and all planned train services to be executed after the fault;

acquiring an idle rolling stock set on the storage tracks, and determining, on a premise of meeting a minimum turn-back time, whether the idle rolling stock set on the storage tracks includes a backup rolling stock that can be executed according to a planned train timetable of an eth to-be-canceled planned train service in the to-be-canceled planned train service set to obtain a first determination result;

adjusting, if the first determination result indicates yes, the rolling stock circulation plan of the planned operation diagram, such that the backup rolling stock that can be executed according to the planned train timetable of the eth to-be-canceled planned train service in the to-be-canceled planned train service set executes the eth to-be-canceled planned train service to obtain the adjusted rolling stock circulation plan;

determining, if the first deter urination result indicates no, according to the earliest time that backup rolling stocks can run to the main line, whether the backup rolling stock set includes a backup rolling stock that can be executed according to the planned train timetable of the eth to-be-canceled planned train service in the to-be-canceled planned train service set to obtain a second determination result;

adjusting, if the second determination result indicates yes, the rolling stock circulation plan of the planned operation diagram, such that the backup rolling stock that can be executed according to the planned train timetable of the eth to-be-canceled planned train service in the to-be-canceled planned train service set executes the eth to-be-canceled planned train service to obtain the adjusted rolling stock circulation plan;

canceling the eth to-be-canceled planned train service if the first determination result indicates no;

updating a numerical value of the to-be-canceled planned train service e, and going back to the step of "acquiring an idle rolling stock set on the storage tracks; and determining, on a premise of meeting a minimum turn-back time, whether the idle rolling stock set on the storage tracks includes a backup rolling stock that can be executed according to a planned train timetable of an eth to-be-canceled planned train service in the to-be-canceled planned train service set to obtain a first determination result", until all to-be-canceled planned train services in the to-be-canceled planned train service set are traversed, to obtain a second set of planned train services to be canceled; and forming a set of planned train services to be canceled $K_{cancel}$ with the first set of planned train services to be canceled and the second set of planned train services to be canceled.

After step S105, according to canceled planned train services, arrival and departure time of adjacent train services are appropriately adjusted to avoid the large number of stranded passengers on the platform due to a large headway, and ensure a uniform headway between the train services, which includes:

acquiring a front train service and a back train service of an fth canceled planned train service in the set of planned train services to be canceled in the initial adjusted train timetable;

determining a first planned running headway between the fth canceled planned train service and the front train service, and a second planned running headway between the fth canceled planned train service and the back train service;

delaying planned arrival and departure time of the front train service according to the first planned running headway by using an equation $$\begin{cases} a_{k_{front},n} = a_{k_{front},n}^{plan} + \dfrac{h_{plan}^{front}}{2}, n = 1, 2, \ldots, N \\ d_{k_{front},n} = d_{k_{front},n}^{plan} + \dfrac{h_{plan}^{front}}{2}, n = 1, 2, \ldots, N \end{cases};$$

and advancing planned arrival and departure time of the back train service according to the second planned running headway by using an equation $$\begin{cases} a_{k_{back},n} = a_{k_{back},n}^{plan} - \dfrac{h_{plan}^{back}}{2}, n = 1, 2, \ldots, N \\ d_{k_{back},n} = d_{k_{back},n}^{plan} - \dfrac{h_{plan}^{back}}{2}, n = 1, 2, \ldots, N \end{cases},$$

where, $a_{k_{front},n}$ and $a_{k_{back},n}$ are adjusted arrival time of a front train service $k_{front}$ and a back train service $k_{back}$ at a station n respectively, $a_{k_{front},n}^{plan}$ and $a_{k_{back},n}^{plan}$ are planned arrival time of the front train service $k_{front}$ and the back train service $k_{back}$ at the station n, $d_{k_{front},n}$ and $d_{k_{back},n}$ are adjusted departure time of the front train service $k_{front}$ and the back train service $k_{back}$ at the station n, $d_{k_{front},n}^{plan}$ and $d_{k_{back},n}^{plan}$ are planned arrival time of the front train service $k_{front}$ and the back train service $k_{back}$ at the station n, $h_{plan}^{front}$ is a first planned running headway between the front train service $k_{front}$ and the canceled train service f, $$h_{plan}^{front} = \begin{cases} d_{f,1}^{plan} - d_{k_{front},1}^{plan}, \text{ if } D_f = 2 \\ d_{f,N}^{plan} - d_{k_{front},N}^{plan}, \text{ if } D_f = 1, D_f = 2 \end{cases}$$

indicates that the canceled train service f is in an up direction, $d_{f,1}^{plan}$ is departure time of the canceled train service f at a station 1, and $d_{k_{front},1}^{plan}$ is departure time of the front train service $k_{front}$ at the station 1; $D_f=1$ indicates that the canceled train service f is in a down direction, $d_{f,N}^{plan}$ is departure time of the canceled train service f at a station N, and $d_{k_{front},N}^{plan}$ is departure time of the front train service $k_{front}$ at the station N; a running direction from the station 1 to the station N is defined as the up direction, and a running direction from the station N to the station 1 is defined as the down direction; and $h_{plan}^{back}$ is the second planned running headway between the canceled train service f and the back train service $k_{back}$, $$h_{plan}^{back} = \begin{cases} d_{k_{back},1}^{plan} - d_{f,1}^{plan}, \text{ if } D_f = 2 \\ d_{k_{back},N}^{plan} - d_{f,N}^{plan}, \text{ if } D_f = 1 \end{cases}, d_{k_{back},1}^{plan}$$

is departure time of the back train service $k_{back}$ at the station 1, and $d_{k_{back},N}^{plan}$ is departure time of the back train service $k_{back}$ at the station N.

Figure 5:
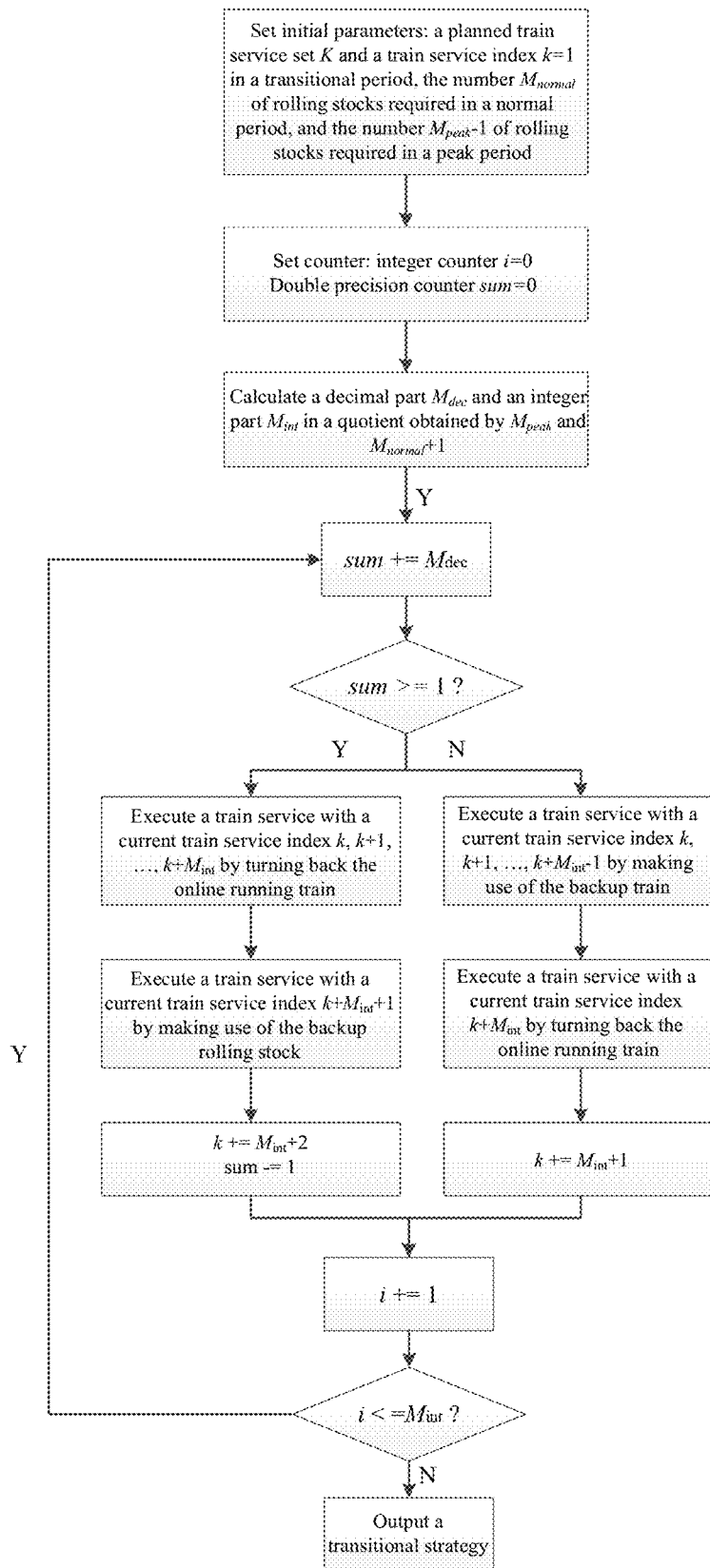
FIG. 5 is a schematic view for reformulating a transitional strategy from a normal period to a peak period according to the present disclosure.

After step S107, transitional and peak train operation strategies are reformulated in a condition where the rolling stock resource is limited and the train out of service cannot be repaired for a long time, where the case that the rolling stock resource is limited indicates that no backup rolling stock can replace the train out of service, and the case that the train out of service cannot be repaired for a long time indicates the train still cannot be normally online in a transitional period from a normal period to a peak period, which includes:

E.1: acquiring the number $M_{normal}$ of rolling stocks required in a normal period, the number $M_{peak}$ of rolling stocks required in a peak period and complete turnaround time T according to the planned operation diagram;

E.2: keeping the number of rolling stocks required in the normal period consistent with the planned operation diagram;

E.3: since the rolling stock resource is limited and the faulty train still cannot run on the line normally, with $M_{peak}-1$ rolling stocks available in the peak period, recalculating a headway $h_{peak}$ in the period by the following equation:

$$h_{peak} = \dfrac{T}{M_{peak} - 1},$$

in a condition where the headway changes in the peak period, a transitional strategy is reformulated from the normal period to the peak period, as shown in FIG. 5; and E.4: executing the planned train services by turning back the online running train and making use of the backup rolling stock, where in the transitional period from the normal period to the peak period, the executed train services are required to be arranged uniformly, with the following specific implementation process:

acquiring an integer part $M_{int}$ of a quotient according to the number $M_{normal}$ of rolling stocks required in the normal period and the number $M_{peak}-1$ of the available rolling stocks in the peak period by using an equation $$M_{int} = \left\lfloor \dfrac{M_{peak} - 1}{M_{normal} + 1} \right\rfloor;$$

acquiring a decimal part $M_{dec}$ of the quotient according to the number $M_{normal}$ of rolling stocks required in the normal period and the number $M_{peak}-1$ of available rolling stocks in the peak period by using an equation $$M_{dec} = \frac{M_{peak} - 1 - M_{int}(M_{normal} + 1)}{M_{normal} + 1};$$

initializing a train service index k'=1, an integer count i=0 and a double precision count sum=0;

setting a double precision count sum+=$M_{dec}$, and determining whether the double precision count sum is greater than 1 to obtain a third determination result;

determining if the third determination result indicates yes, that a train service with a current train service index k', k'+1, ..., k'+$M_{int}$ is executed by turning back the online running train, and a train service with a current train service index k'+$M_{int}$+1 is executed by making use of the backup rolling stock, and setting k'+=$M_{int}$+2, sun-=1;

determining if the third determination result indicates no, that a train service with a current train service index k', k'+1, ..., k'+$M_{int}$-1 is executed by turning back the online running train, and a train service with a current train service index k'+$M_{int}$ is executed by making use of the backup rolling stock, and setting k'+=$M_{int}$+2;

determining whether the integer count is less than or equal to the integer part $M_{int}$ of the quotient to obtain a fourth determination result;

setting, if the fourth determination result indicates yes, the integer count i to be added by 1, and going back to the step of "setting a double precision count sum+=$M_{dec}$, and determining whether the double precision count sum is greater than 1 to obtain a third determination result"; and outputting, if the fourth determination result indicates no, a rolling stock circulation plan for executing the planned train services in the peak period.

The present disclosure has the following advantages: (1) the present disclosure implements intelligent train operation adjustment for the metro system in the train out of service, thereby reducing the labor intensity of the dispatchers; (2) the present disclosure makes a decision automatically to ensure the reasonable result by comprehensively considering available rolling stock resources and line resources in the metro system and utilizing multiple operation adjustment methods; and (3) the present disclosure replaces the command delivery via telephone with an automatic method, thereby improving efficiency and accuracy of information delivery.

The present disclosure further provides an operation adjustment system for metro trains under the condition of train out of service, including:

an information acquiring module, configured to acquire, when a train has fault, basic parameters of a metro system, information of a train out of service and information of online normal running trains, where the basic parameters of the metro system include topological metro line information and a planned operation diagram; the planned operation diagram includes train timetables and a rolling stock circulation plan; the information of the train out of service includes a faulty train service, train fault time, predicted time to stop service and a fault position; and the information of the online normal running trains includes train service numbers, train velocities when the fault occurs and positions when the fault occurs;

a follow-up train service and current train timetable determining module, configured to determine, according to the basic parameters of the metro system, the faulty train service out of service and the planned operation diagram, a follow-up train service set of the faulty train service and a current train timetable for each follow-up train service in the follow-up train service set, where the follow-up train services include tracking train services of the faulty train and planned train services not started;

a module for acquiring an adjusted train timetable of each follow-up train service, configured to adjust, according to the predicted time to stop service of the train out of service, with a minimum headway as a constraint and a minimal deviation from the train timetables as a goal, the current train timetable for each follow-up train service in the follow-up train service set to obtain an adjusted train timetable for each follow-up train service in the follow-up train service set, and determine initial adjusted train timetables;

a module for determining earliest time that backup rolling stocks can run to the main line, configured to determine, according to the basic parameters of the metro system and the train fault time of the train out of service, earliest time that backup rolling stocks can run to the main line in the metro system;

an adjusted rolling stock circulation plan acquiring module, configured to cancel, according to the adjusted train timetable for each follow-up train service in the follow-up train service set, the earliest time that backup rolling stocks can run to the main line, all planned train services to be executed after the fault, and the rolling stock circulation plan of the planned operation diagram, planned train services that cannot be executed according to the planned train timetables in the planned operation diagram, to obtain a set of planned train services to be canceled, and determine rolling stocks for executing remaining planned train services in the planned operation diagram, to obtain an adjusted rolling stock circulation plan;

a module for acquiring information of an adjusted planned operation diagram, configured to adjust the initial adjusted train timetables according to a planned train timetable for each planned train service in the set of planned train services to be canceled, to obtain final adjusted train timetables; and an adjusted operation diagram generating module, configured to generate an adjusted operation diagram according to the adjusted rolling stock circulation plan and the final adjusted train timetables.

The system further includes:

a module for acquiring the number of available rolling stocks in a peak period, configured to acquire, in a peak period after the fault occurs in the train, if a rolling stock resource is limited and the train out of service is not be repaired, the number $M_{normal}$ of rolling stocks required in a normal period and the number $M_{peak}-1$ of available rolling stocks in the peak period from the information of the adjusted planned operation diagram; and a module for determining a rolling stock circulation plan in the peak period, configured to redetermine, according to the number $M_{normal}$ of the rolling stocks required in the normal period and the number $M_{peak}-1$ of the available rolling stocks in the peak period by turning back an online running train and making use of a backup rolling stock, a rolling stock circulation plan for executing planned train services in the peak period.

Each embodiment of the present specification is described in a progressive manner, each embodiment focuses on the difference from other embodiments, and the same and similar parts between the embodiments may refer to each other.

For the system disclosed in the embodiments, since the system corresponds to the method disclosed in the embodiments, the description is relatively simple, and reference can be made to the method description.

In this specification, several specific embodiments are used for illustration of the principles and implementations of the present disclosure. The description of the foregoing embodiments is used to help illustrate the method of the present disclosure and the core ideas thereof. In addition, persons of ordinary skill in the art can make various modifications in terms of specific implementations and the scope of application in accordance with the ideas of the present disclosure. In conclusion, the content of this specification shall not be construed as a limitation to the present disclosure.

What is claimed is:

1. An operation adjustment method for metro trains under the condition of train out of service, comprising:
  acquiring, when a train has fault, basic parameters of a metro system, information of the train out of service and information of online normal running trains, wherein the basic parameters of the metro system comprise topological metro line information and a planned operation diagram; the planned operation diagram comprises train timetables and a rolling stock circulation plan; the information of the train out of service comprises a faulty train service, train fault time, predicted time to stop service and a fault position; and the information of the online normal running trains comprises train service numbers, train velocities when the fault occurs and positions when the fault occurs;
  determining, according to the basic parameters of the metro system, the faulty train service out of service and the planned operation diagram, a follow-up train service set of the faulty train service and a current train timetable for each of follow-up train services in the follow-up train service set, wherein the follow-up train services comprise tracking train services of the faulty train and planned train services not started;
  adjusting, according to the predicted time to stop service of the train out of service, with a minimum headway as a constraint and a minimal deviation from the train timetables as a goal, the current train timetable for each follow-up train service in the follow-up train service set to obtain an adjusted train timetable for each follow-up train service in the follow-up train service set, and determining initial adjusted train timetables;
  determining, according to the basic parameters of the metro system and the train fault time of the train out of service, earliest time that backup rolling stocks can run to the main line in the metro system;
  canceling, according to the adjusted train timetable for each follow-up train service in the follow-up train service set, the earliest time that backup rolling stocks can run to the main line, all planned train services to be executed after the fault, and the rolling stock circulation plan of the planned operation diagram, planned train services that are not executed according to the planned train timetables in the planned operation diagram, to obtain a set of planned train services to be canceled, and determining rolling stocks for executing remaining planned train services in the planned operation diagram, to obtain an adjusted rolling stock circulation plan;
  adjusting the initial adjusted train timetables according to a planned train timetable for each planned train service in the set of planned train services to be canceled, to obtain final adjusted train timetables; and
  generating an adjusted operation diagram according to the adjusted rolling stock circulation plan and the final adjusted train timetables;
  wherein adjusting, according to the predicted time to stop service of the train out of service, with the minimum headway as a constraint and the minimal deviation from the planned train timetable as the goal, the current train timetable for each follow-up train service in the follow-up train service set to obtain the adjusted train timetable for each follow-up train service in the follow-up train service set, comprises:
  determining, based on the speed curves of running levels in the onboard automatic train operation (ATO) system by using an equation $$r_{k,n} = \sum_{l \in L} \delta^l_{k,n} r^l_{kn},$$

running time of each follow-up train service in the follow-up train service set between two adjacent subsequent stations behind a position when the fault occurs;
  determining, by using an equation $$d_{k,n} = \frac{\min\{P^{wait}_{k,n}, C^{remain}_{k,n}\}}{\lambda},$$

dwelling time of each follow-up train service in the follow-up train service set at each follow-up station behind the position when the fault occurs; and
  adjusting, according to the predicted time to stop service of the train out of service, running time of each follow-up train service between subsequent stations, the dwelling time of each follow-up train service at each follow-up station and a train velocity of each follow-up train service when the fault occurs, with the minimum headway as a constraint and the minimal deviation from the planned train timetable as the goal, the current train timetable for each follow-up train service in the follow-up train service set to obtain the adjusted train timetable for each follow-up train service in the follow-up train service set, and
  wherein, $r_{k,n}$ is running time of a follow-up train service k between a follow-up station n−1 and a follow-up station n; $\delta_{k,n}^l$ indicates whether the follow-up train service k selects an identifier with a level l in an interval between the follow-up station n−1 and the follow-up station n, and when the follow-up train service k runs at the level l in the interval, then $\delta_{k,n}^l = 1$, or when the follow-up train service k does not run at the level l in the interval, $\delta_{k,n}^l = 0$; $r_{k,n}^l$ is time required by the follow-up train service k to run at the level l in the interval between the follow-up station n−1 and the follow-up station n; $d_{k,n}$ is dwelling time of the follow-up train service k at the follow-up station n; $P_{k,n}^{wait}$ is a number of passengers waiting on a platform when the follow-up train service k arrives at the follow-up station n; $C_{k,n}^{remain}$ is a remaining passenger capacity when the follow-up train service k arrives at the follow-up station n; and $\lambda$ is a passenger boarding rate.

2. The operation adjustment method for the metro trains under the condition of train out of service according to claim 1, wherein after determining, according to the basic parameters of the metro system, the faulty train service out of service and the information of the online normal running trains, the follow-up train service set of the faulty train service and the current train timetable for each of follow-up train services in the follow-up train service set, the method further comprises:

determining, according to the fault position of the train out of service by using an equation $$j' = \underset{j}{\operatorname{argmin}} |S_{fault} - S_j^{line} \cdot \eta_j|,$$

parking position nearest to the train out of service; and
storing the train out of service to the nearest parking position,
wherein, j' is the parking position nearest to the train out of service, $S_{fault}$ is the fault position of the train out of service, $S_j^{line}$ is a position of a jth storage track, and $n_j$ is an occupation sign of the jth storage track.

3. The operation adjustment method for the metro trains under the condition of train out of service according to claim 1, wherein determining, according to the basic parameters of the metro system and the train fault time of the train out of service, earliest time that backup rolling stocks can run to the main line in the metro system, comprises:

acquiring a backup rolling stock set on all storage tracks from the topological metro line information of the basic parameters of the metro system; and
determining, according to the train fault time of the train out of service by using an equation $T_m^{earliest} = T_{fault} + t_{j_m}^{online}$, earliest time that each backup rolling stock in the backup rolling stock set runs to a main line as the earliest time that backup rolling stocks can run to the main line,
wherein, $T_m^{earliest}$ is earliest time that a backup rolling stock m runs to the main line, $T_{fault}$ is the train fault time of the train out of service, $j_m$ is a storage track where the backup rolling stock m is located, and $t_{j_m}^{online}$ is time that the backup rolling stock m runs from the storage track $j_m$ to the main line.

4. The operation adjustment method for the metro trains under the condition of train out of service according to claim 3, wherein canceling, according to the adjusted train timetable for each follow-up train service in the follow-up train service set, the earliest time that backup rolling stocks can run to the main line, all planned train services to be executed after the fault, and the rolling stock circulation plan of the planned operation diagram, the planned train services that are not executed according to the planned train timetables in the planned operation diagram, to obtain the set of planned train services to be canceled, and determining the rolling stocks for executing the remaining planned train services in the planned operation diagram, to obtain the adjusted rolling stock circulation plan, comprises:

comparing the adjusted train timetable for each follow-up train service in the follow-up train service set with the planned operation diagram to obtain planned train services required to depart lately at corresponding origin stations in the planned operation diagram and late departure time of the late departing planned train services;
canceling corresponding late departing planned train services with late departure time greater than preset maximum late departure time to obtain a first set of planned train services to be canceled;
forming a to-be-canceled planned train service set with a planned turn-back train service of each follow-up train service in the follow-up train service set and all planned train services to be executed after the fault;
acquiring an idle rolling stock set on the storage tracks, and determining, on a premise of meeting a minimum turn-back time, whether the idle rolling stock set on the storage tracks comprises a backup rolling stock that is executed according to a planned train timetable of an eth to-be-canceled planned train service in the to-be-canceled planned train service set to obtain a first determination result;
adjusting, when the first determination result indicates yes, the rolling stock circulation plan of the planned operation diagram, such that the backup rolling stock that is executed according to the planned train timetable of the eth to-be-canceled planned train service in the to-be-canceled planned train service set executes the eth to-be-canceled planned train service to obtain the adjusted rolling stock circulation plan;
determining, when the first determination result indicates no, according to the earliest time that backup rolling stocks can run to the main line, whether the backup rolling stock set comprises a backup rolling stock that is executed according to the planned train timetable of the eth to-be-canceled planned train service in the to-be-canceled planned train service set to obtain a second determination result;
adjusting, when the second determination result indicates yes, the rolling stock circulation plan of the planned operation diagram, such that the backup rolling stock that is executed according to the planned train timetable of the eth to-be-canceled planned train service in the to-be-canceled planned train service set executes the eth to-be-canceled planned train service to obtain the adjusted rolling stock circulation plan;
canceling the eth to-be-canceled planned train service when the first determination result indicates no;
updating a numerical value of the to-be-canceled planned train service e, and going back to the step of "acquiring an idle rolling stock set on the storage tracks, and determining, on a premise of meeting a minimum turn-back time, whether the idle rolling stock set on the storage tracks comprises a backup rolling stock that is executed according to a planned train timetable of an eth to-be-canceled planned train service in the to-be-canceled planned train service set to obtain a first determination result", until all to-be-canceled planned train services in the to-be-canceled planned train service set are traversed, to obtain a second set of planned train services to be canceled; and
forming a set of planned train services to be canceled with the rst set of planned train services to be canceled and the second set of planned train services to be canceled.

5. The operation adjustment method for the metro trains under the condition of train out of service according to claim 1, wherein after canceling, according to the adjusted train timetable for each follow-up train service in the follow-up train service set, the earliest time that backup rolling stocks can run to the main line, all planned train services to be executed after the fault, and the rolling stock circulation plan of the planned operation diagram, the planned train services that are not executed according to the planned train timetables in the planned operation diagram, to obtain the set of planned train services to be canceled, and determining the rolling stocks for executing the remaining planned train services in the planned operation diagram, to obtain the adjusted rolling stock circulation plan, the method further comprises:

acquiring a front train service and a back train service of an fth canceled planned train service in the set of planned train services to be canceled in the initial adjusted train timetable;

determining a first planned running headway between the fth canceled planned train service and the front train service, and a second planned running headway between the fth canceled planned train service and the back train service;

delaying planned arrival and departure time of the front train service according to the first planned running headway by using an equation $$\begin{cases} a_{k_{front},n} = a^{plan}_{k_{front},n} + \dfrac{h^{front}_{plan}}{2}, n = 1, 2, \ldots, N \\ d_{k_{front},n} = d^{plan}_{k_{front},n} + \dfrac{h^{front}_{plan}}{2}, n = 1, 2, \ldots, N \end{cases};$$

and advancing planned arrival and departure time of the back train service according to the second planned running headway by using an equation $$\begin{cases} a_{k_{back},n} = a^{plan}_{k_{back},n} - \dfrac{h^{back}_{plan}}{2}, n = 1, 2, \ldots, N \\ d_{k_{back},n} = d^{plan}_{k_{back},n} - \dfrac{h^{back}_{plan}}{2}, n = 1, 2, \ldots, N \end{cases},$$

wherein, $a_{k_{front},n}$ and $a_{k_{back},n}$ are adjusted arrival time of a front train service $k_{front}$ and a back train service $k_{back}$ at a station n, $a^{plan}_{k_{front},n}$ and $a^{plan}_{k_{back},n}$ are planned arrival time of the front train service $k_{front}$ and the back train service $k_{back}$ at the station n, $d_{k_{front},n}$ and $d_{k_{back},n}$ are adjusted departure time of the front train service $k_{front}$ and the back train service $k_{back}$ at the station n, $d^{plan}_{k_{front},n}$ and $d^{plan}_{k_{back},n}$ are planned arrival time of the front train service $k_{front}$ and the back train service $k_{back}$ at the station n, $h^{front}_{plan}$ is a first planned running headway between the front train service $k_{front}$ and the canceled train service f, $$h^{front}_{plan} = \begin{cases} d^{plan}_{f,1} - d^{plan}_{k_{front},1}, & \text{if } D_f = 2 \\ d^{plan}_{f,N} - d^{plan}_{k_{front},N}, & \text{if } D_f = 1, D_f = 2 \end{cases}$$

indicates that the canceled train service f is in an up direction, $d_{f,1}^{plan}$ is departure time of the canceled train service f at a station 1, and $d_{k_{front},1}^{plan}$ is departure time of the front train service $k_{front}$ at the station 1; $D_f = 1$ indicates that the canceled train service f is in a down ward direction, $d_{f,N}^{plan}$ is departure time of the canceled train service f at a station N, and $d_{k_{front},N}^{plan}$ is departure time of the front train service $k_{front}$ at the station N; a running direction from the station 1 to the station N is defined as the up direction, and a running direction from the station N to the station 1 is defined as the down direction; and $h_{plan}^{back}$ is a second planned running headway between the canceled train service f and the back train service $k_{back}$, $$h^{back}_{plan} = \begin{cases} d^{plan}_{k_{back},1} - d^{plan}_{f,1}, & \text{if } D_f = 2 \\ d^{plan}_{k_{back},N} - d^{plan}_{f,N}, & \text{if } D_f = 1 \end{cases}, d^{plan}_{k_{back},1}$$

is a departure time of the back train service $k_{back}$ at the station 1, and $d_{k_{back},N}^{plan}$ is departure time of the back train service $k_{back}$ at the station 1, and $d_{k_{back},N}^{plan}$ is departure time of the back train service $k_{back}$ at the station N.

6. The operation adjustment method for the metro trains under the condition of train out of service according to claim 1, wherein ater generating the adjusted operation diagram according to the adjusted rolling stock circulation plan and the final adjusted train timetable, the method further comprises:

acquiring, in a peak period after the fault occurs in the train, when a rolling stock resource is limited and the train out of service is not repaired, a number $M_{normal}$ of rolling stocks required in a normal period and a number $M_{peak}-1$ of available rolling stocks in the peak period from information of the adjusted operation diagram; and redetermining, according to the number $M_{normal}$ of the rolling stocks required in the normal period and the number $M_{peak}-1$ of the available rolling stocks in the peak period by turning back an online running train and making use of a backup rolling stock, a rolling stock circulation plan for executing planned train services in the peak period.

7. The operation adjustment method for the metro trains under the condition of train out of service according to claim 6, wherein redetermining, according to the number $M_{normal}$ of the rolling stocks required in the normal period and the number $M_{peak}-1$ of the available rolling stocks in the peak period by turning back the online running train and making use of the backup rolling stock, the rolling stock circulation plan for executing the planned train services in the peak period, comprises:

acquiring an integer part $M_{int}$ of a quotient according to the number $M_{normal}$ of the rolling stocks required in the normal period and the number $M_{peak}-1$ of the available rolling stocks in in the peak period by using an equation $$M_{int} = \left\lfloor \dfrac{M_{peak} - 1}{M_{normal} + 1} \right\rfloor;$$

acquiring a decimal part $M_{dec}$ of the quotient according to the number $M_{normal}$ of the rolling stocks required in the normal period and the number $M_{peak}-1$ of the available rolling stocks in the peak period by using an equation $$M_{dec} = \dfrac{M_{peak} - 1 - M_{int}(M_{normal} + 1)}{M_{normal} + 1};$$

initializing a train service index k'=1, an integer count i=0 and a double precision count sum=0;

setting a double precision count Sum+=$M_{dec}$, and determining whether the double precision count sum is greater than 1 to obtain a third determination result;

determining, when the third determination result indicates yes, that a train service with a current train service index k', k'+1, . . . , k'+$M_{int}$ is executed by turning back the online running train, and a train service with a current train service index $k'+M_{int}+1$ is executed by making use of the backup rolling stock, and setting $k'+=M_{int}+2, sum-=1$;

determining, when the third determination result indicates no, that a train service with a current train service index $k', k'+1, \ldots, k'+M_{int}$ is executed by turning back the online running train, and a train service with a current train service index $k'+M_{int}$ is executed by making use of the backup rolling stock, and setting $k'=M_{int}+2$;

determining whether the integer count i is less than or equal to the integer part $M_{int}$ of the quotient to obtain a fourth determination result;

setting, when the fourth determination result indicates yes, the integer count i to be added by 1, and going back to the step of "setting a double precision count sum+=$M_{dec}$, and determining whether the double precision count sum is greater than 1 to obtain a third determination result"; and outputting, when the fourth determination result indicates no, the rolling stock circulation plan for executing the planned train services in the peak period.

* * * * *